(12) United States Patent
Pontarelli

(10) Patent No.: US 7,194,642 B2
(45) Date of Patent: Mar. 20, 2007

(54) TECHNIQUE TO COORDINATE SERVICING OF MULTIPLE NETWORK INTERFACES

(75) Inventor: Mark C. Pontarelli, Escondido, CA (US)

(73) Assignee: Intel Corporation, Santa Clara, CA (US)

( * ) Notice: Subject to any disclaimer, the term of this patent is extended or adjusted under 35 U.S.C. 154(b) by 520 days.

(21) Appl. No.: 10/634,602

(22) Filed: Aug. 4, 2003

(65) Prior Publication Data

US 2005/0034001 A1 Feb. 10, 2005

(51) Int. Cl.
*G06F 1/32* (2006.01)
*G06F 1/00* (2006.01)

(52) U.S. Cl. ...................... 713/320; 713/323
(58) Field of Classification Search ............. 713/320, 713/323

See application file for complete search history.

(56) References Cited

U.S. PATENT DOCUMENTS

| | | | |
|---|---|---|---|
| 5,708,814 A * | 1/1998 | Short et al. | 710/260 |
| 5,802,305 A * | 9/1998 | McKaughan et al. | 709/227 |
| 6,098,100 A * | 8/2000 | Wey et al. | 709/223 |
| 6,105,102 A * | 8/2000 | Williams et al. | 710/261 |
| 6,195,725 B1 | 2/2001 | Luhmann | |
| 6,430,628 B1 | 8/2002 | Connor | |
| 6,452,910 B1 * | 9/2002 | Vij et al. | 370/310 |
| 6,493,824 B1 * | 12/2002 | Novoa et al. | 713/162 |
| 6,741,836 B2 * | 5/2004 | Lee et al. | 455/41.2 |
| 2002/0025839 A1 | 2/2002 | Usui | |
| 2003/0125019 A1 | 7/2003 | Bajikar | |

FOREIGN PATENT DOCUMENTS

EP 1 089 578 A2 4/2001
GB 2 379 365 A 3/2003

OTHER PUBLICATIONS

International Search Report, International App. No.: PCT/US2004/024056, Applicant Ref. No.: P16719PCT, Date of completion: Jan. 24, 2005, Date mailed: Feb. 2, 2005, 5 pages.
"Wi-Fi(TM) (802.11b) and Bluetooth(TM): An Examination of Coexistence Approaches," Mobilian Corporation, 2001, pp. 1-25, Hillsboro, OR, USA.

* cited by examiner

*Primary Examiner*—Thomas Lee
*Assistant Examiner*—Ji H. Bae
(74) *Attorney, Agent, or Firm*—Kacvinsky LLC

(57) ABSTRACT

Various embodiments are described to coordinate the servicing of multiple network interfaces.

19 Claims, 6 Drawing Sheets

TECHNIQUE TO COORDINATE SERVICING OF MULTIPLE NETWORK INTERFACES

BACKGROUND INFORMATION

Some computing systems may use a number of techniques to decrease or manage the consumption of power. Some systems may automatically place the processor and other components in a power saving state, such as an idle state or standby state, during periods of inactivity. For example, some systems may include a wake on LAN (local area network) feature that may wake the processor from its power saving state when activity is detected on its LAN interface.

Network interfaces are now available for a variety of different networks, such as Wireless Local Area Network (WLAN) such as 802.11, Wireless Personal Area Networks (WPAN) such as Bluetooth, Ethernet networks, and the like. In some cases, it may even be possible for a computing system to operate over two of these different networks at the same time. For example, a computer may communicate with a printer, for example, over a WPAN or Bluetooth link or network while simultaneously communicating with an 802.11 Access Point (AP) via a 802.11 WLAN network.

While some systems may include power management features in general, processing of events for different network interfaces until now has been uncoordinated. Such an uncoordinated approach of servicing events may reduce the time for the host processor to be in a power saving state and may increase the amount of power consumed by the system. A need may exist for an improved technique to service multiple network interfaces.

DETAILED DESCRIPTION

Figure 1:
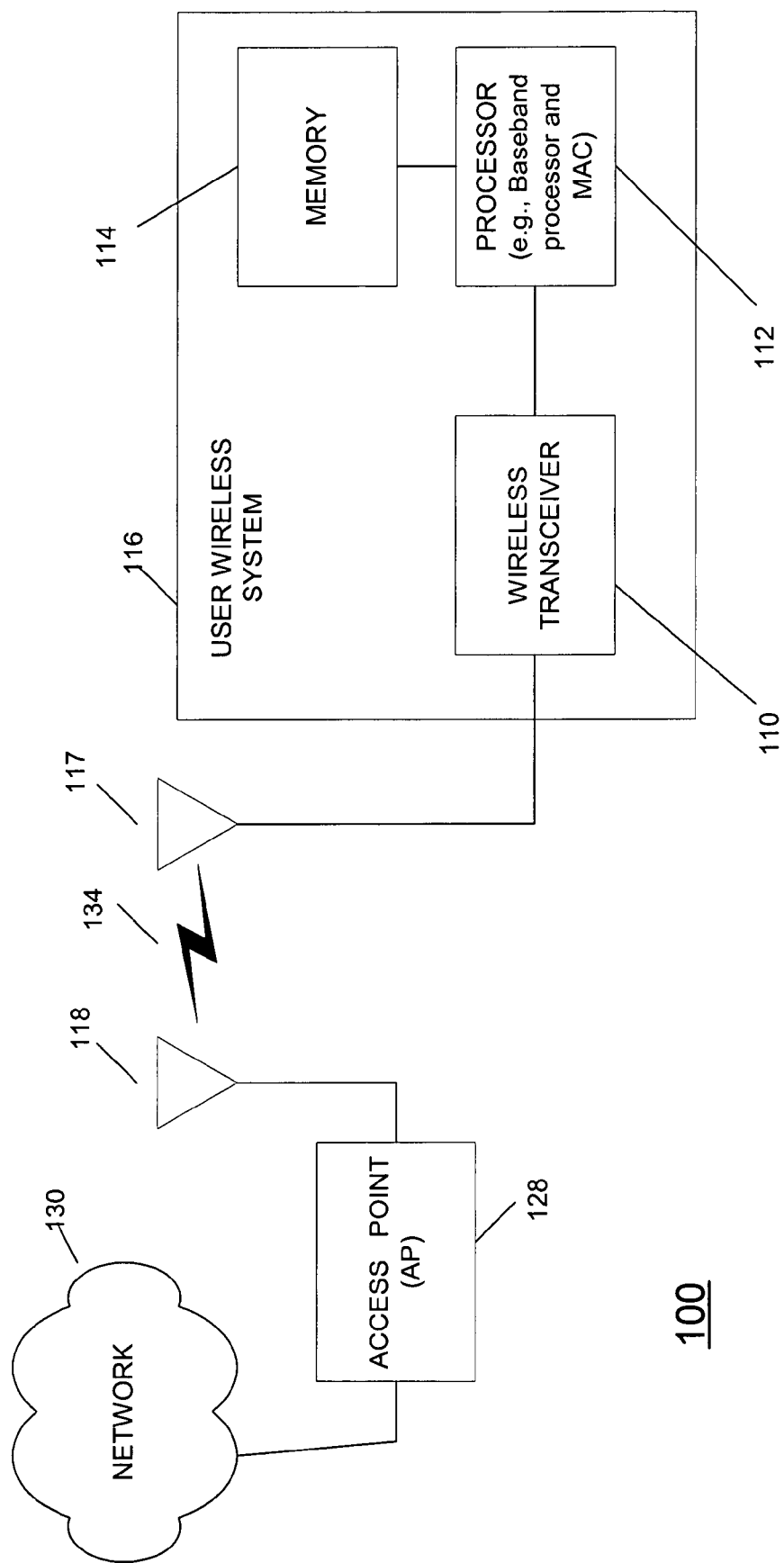
FIG. 1 is a diagram illustrating an example of a wireless communication system in accordance with one embodiment of the invention.

In the detailed description, numerous specific details are set forth in order to provide a thorough understanding of the embodiments of the invention. It will be understood by those skilled in the art, however, that embodiments of the invention may be practiced without these specific details. In other instances, well-known methods, procedures and techniques have not been described in detail so as not to obscure the foregoing embodiments.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It is worthy to note that any reference in the specification to "one embodiment" or "an embodiment" means in this context that a particular feature, structure, or characteristic described in connection with the embodiment may be included in at least one embodiment of the invention. The appearances of the phrase "in one embodiment" or "an embodiment" in various places in the specification do not necessarily refer to the same embodiment, but may be referring to different embodiments.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), and the like, although the scope of the invention is not limited in this respect.

For example, the techniques described herein may be applied to any of a wide variety of computing systems. The term computing system may include a mobile device, a PDA, a wired communications device, a wireless communications device, a cellular telephone, a computer, a router, a switch, a wireless or wired network interface, an Access Point (AP), a modem, a gateway, bridge or router, and so forth.

As used herein, the term packet may include a unit of data that may be routed or transmitted between nodes or stations or across a network. As used herein, the term packet may include frames, protocol data units or other units of data. A packet may include a group of bits, which may include one or more address fields, control fields and data, for example. A data block may be any unit of data or information bits.

Referring to the Figures in which like numerals indicate like elements, FIG. 1 is a diagram illustrating an example of a wireless communication system in accordance with one embodiment of the invention. In the communications system 100 shown in FIG. 1, a user wireless system 116 may include a wireless transceiver 110 coupled to an antenna 117 and to a processor 112. Processor 112 in one embodiment may comprise a single processor, or alternatively may comprise a baseband processor and an applications processor, although the scope of the invention is not limited in this respect. According to one embodiment, processor 112 may include a baseband processor and Medium Access Control (MAC).

Processor 112 may couple to a memory 114 which may include volatile memory such as DRAM, non-volatile memory such as flash memory, or alternatively may include other types of storage such as a hard disk drive, although the scope of the invention is not limited in this respect. Some portion or all of memory 114 may be included on the same integrated circuit as processor 112, or alternatively some portion or all of memory 114 may be disposed on an integrated circuit or other medium, for example a hard disk drive, that is external to the integrated circuit of processor 112, although the scope of the invention is not limited in this respect. According to one embodiment, software may be provided in memory 114 to be executed by processor 112 to allow wireless system 116 to perform a variety of tasks, some of which may be described herein.

Wireless system 116 may communicate with an access point (AP) 128 (or other wireless system) via wireless communication link 134, where access point 128 may include at least one antenna 118. Antennas 117 and 118 may each be, for example, a directional antenna or an omni directional antenna, although the invention is not limited thereto. Although not shown in FIG. 1, AP 128 may, for example, include a structure that is similar to wireless system 116, including a wireless transceiver, a processor, a memory, and software provided in memory to allow AP 128 to perform a variety of functions. In an example embodiment, wireless system 116 and AP 128 may be considered to be stations in a wireless communication system, such as a WLAN system.

Access point 128 may be coupled to network 130 so that wireless system 116 may communicate with network 130, including devices coupled to network 130, by communicating with access point 128 via wireless communication link 134. Network 130 may include a public network such as a telephone network or the Internet, or alternatively network 130 may include a private network such as an intranet, or a combination of a public and a private network, although the scope of the invention is not limited in this respect.

Communication between wireless system 116 and access point 128 may be implemented via a wireless local area network (WLAN), for example a network which may be compliant with an Institute of Electrical and Electronics Engineers (IEEE) standard such as IEEE 802.11a, IEEE 802.11b, IEEE 802.11g and so on, although the scope of the invention is not limited in this respect.

In another embodiment, communication between wireless system 116 and access point 128 may be implemented via a cellular communication network compliant with a 3GPP standard, although the scope of the invention is not limited in this respect.

Figure 2:
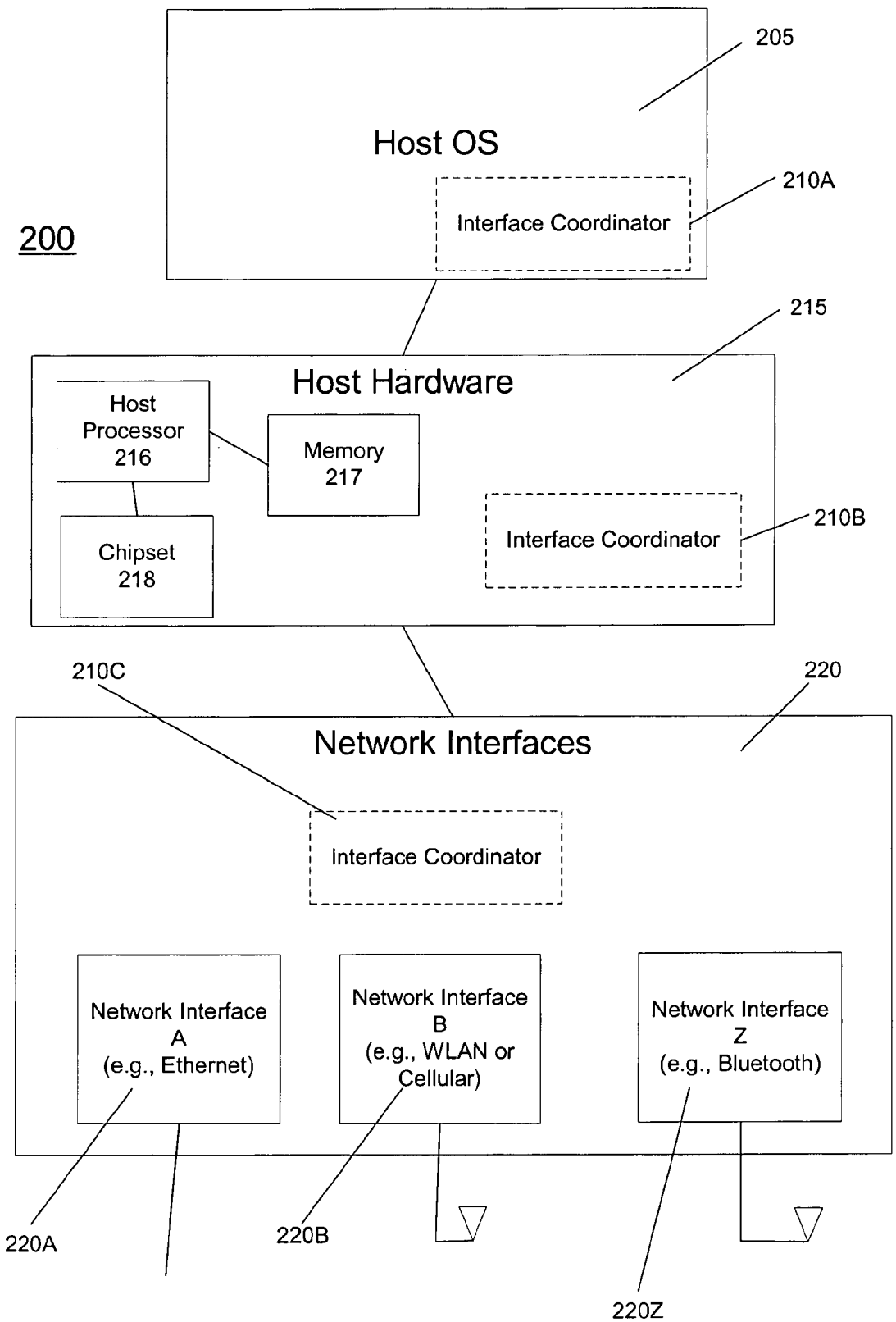
FIG. 2 is a block diagram illustrating a computing system according to an example embodiment.

FIG. 2 is a block diagram illustrating a computing system according to an example embodiment, although the invention is not limited thereto. Computing system 200 may include a host operating system (OS) 205, and host hardware 215. Host hardware 205 may include, for example, a host processor 216 coupled to a memory 217 and a chipset 218. The host processor 216 may, for example, execute instructions stored in memory and may also handle or service a wide variety of events, from time to time.

Also as shown in FIG. 2, a plurality of network interfaces 220 may be coupled to the host hardware 215 (e.g., coupled to the chipset 218). Each of network interfaces 220 may interface processor 216 and/or chipset 218 to a network or communication link. For example network interface A (220A) may be coupled to an Ethernet network, network interface B (220B) may be in communication with a wireless network, such as a WLAN network or cellular network, network interface Z (220Z) may be coupled to a WPAN network or link, such as Bluetooth, and so on. Any number of network interfaces may be provided.

System 200 in FIG. 2 also may include a network interface coordinator 210 to coordinate the servicing of events for the one or more network interfaces 220, or to coordinate the servicing of the various network interfaces. Network interface coordinator 210 may be provided as either hardware, software or a combination or hardware and software (or firmware or microcode, etc.).

Also, network interface coordinator may be provided at a number of different levels or locations within system 200. For example, network coordinator 210A may be implemented as software, such as part of host operating system 205 or other software running on system 200. Alternatively, network interface coordinator 210B may be provided as part of or within host hardware 215. For example, network interface coordinator 210B may be provided as hardware within chipset 218 (or a combination of hardware and firmware/software), etc. In yet another embodiment, network interface coordinator 210C may be provided within or as part of a group of interfaces 220 (e.g., as part of an interface card). The placement of interface coordinator 210 either in host hardware (310B) or within the network interfaces (210C) may be referred to as an embedded network interface controller, although the invention is not limited thereto. The embodiments shown in FIG. 2 is illustrative, and the invention is not limited thereto.

According to an example embodiment, network interface coordinator 210 may coordinate the servicing (e.g., processing, handling) of various events for (or related to) the different network interfaces 220, and/or coordinate the servicing of the various network interfaces, although the invention is not limited thereto.

According to an example embodiment, a network interface 220 may include a baseband section, which may include a media access control (MAC), and a physical layer interface. The physical layer interface may include amplifiers and filters to generate signals having the appropriate electrical qualities for transmission. The physical layer interface may include a radio or radio transmitter/receiver for transmitting and receiving signals via a wireless channel.

In an example embodiment, the baseband section for each of multiple interfaces may be provided on a separate chip. In another embodiment, a single chip may include the baseband section for multiple network interfaces. For example, a network interface card may include a radio interface for a WLAN interface and a radio interface for a Bluetooth interface, and a combined baseband section as one chip for both the WLAN and Bluetooth network interfaces, although the invention is not limited thereto. The interface coordinator may be provided on the network interface card, in another example embodiment.

According to an example embodiment, the host processor 216 may service a plurality of the network interfaces, for example, whenever the host queries one of the interfaces or whenever one of the interfaces generates (or receives) an event or wakes the host processor, although the invention is not limited thereto. This may involve, for example, the host processor servicing the network interface that generated the event or that was initially queried by the host, and then the host processor servicing one or more of the other network interfaces before returning to a power saving mode. According to another embodiment, a host processor 216 and/or interface coordinator 210 may aggregate the servicing of events for multiple network interfaces (e.g., service the events for multiple interfaces during a same wake session). Such a coordinated approach to servicing multiple network interfaces (or servicing of events) may allow the host processor to make more efficient use of its wake time and increase the amount of time it is in a power saving state (e.g., idle, standby).

An event may include, for example, synchronous events and asynchronous events. Synchronous events may include, for example, scheduled or timed events, such as a host processor timer event, an operating system timer event or other timer or scheduled event, or other events that may occur on a periodic or regular basis, or according to some schedule (regular schedule, variable schedule, etc.). Synchronous events may be generated by a host operating system, host hardware and/or network interfaces. A synchronous event may include, for example, a host processor timer event triggering or causing the processor to wake every N minutes to cause the Bluetooth interface to perform a Bluetooth device inquiry, to wake the processor every X minutes to invoke a WLAN network interface to perform network discovery, to wake the processor to invoke the cellular interface to make a call to check voice mail every 10 minutes, etc., although the invention is not limited thereto. Synchronous events may include a host or operating system timer.

Examples of asynchronous events may include unscheduled, unpredictable, random or untimed events such as a request from another system or device to establish a wireless connection over a wireless interface, receipt of a packet(s) that may need to be processed by the host processor, receipt of a cellular call over a cellular interface, receipt of a request to set up a Voice over IP (Internet Protocol) call over a wired or wireless network interface, etc., although the invention is not limited thereto. Asynchronous events may include external events, such as events generated by an external device (e.g., a packet or a connection request received from a remote communication system), and in some cases could include an internal event. These are just some example events which may be serviced or processed by a host processor, and the invention is not limited thereto.

In addition, as used herein, servicing an interface may refer to, for example, a host processor performing a variety of tasks to or for a network interface or in response to information received at the network interface, querying the interface, or processing some data for the network interface, etc. For example, servicing an interface may refer to a host processor responding to a received event (e.g., processing a packet received over a network interface), performing an action upon a network interface or communicating with a network interface such as querying the network interface to determine if further host processing or servicing may be needed for the network interface. Servicing a network interface may also include the host processor communicating with the network interface to cause the network interface to perform some function, such as causing or requesting the Bluetooth interface to perform a Bluetooth device query, requesting a WLAN interface to perform a WLAN network discovery, requesting an Ethernet Interface to establish a network connection, etc. These are just a few illustrative examples of interface servicing that the host processor may perform, and the invention is not limited thereto.

Figure 3:
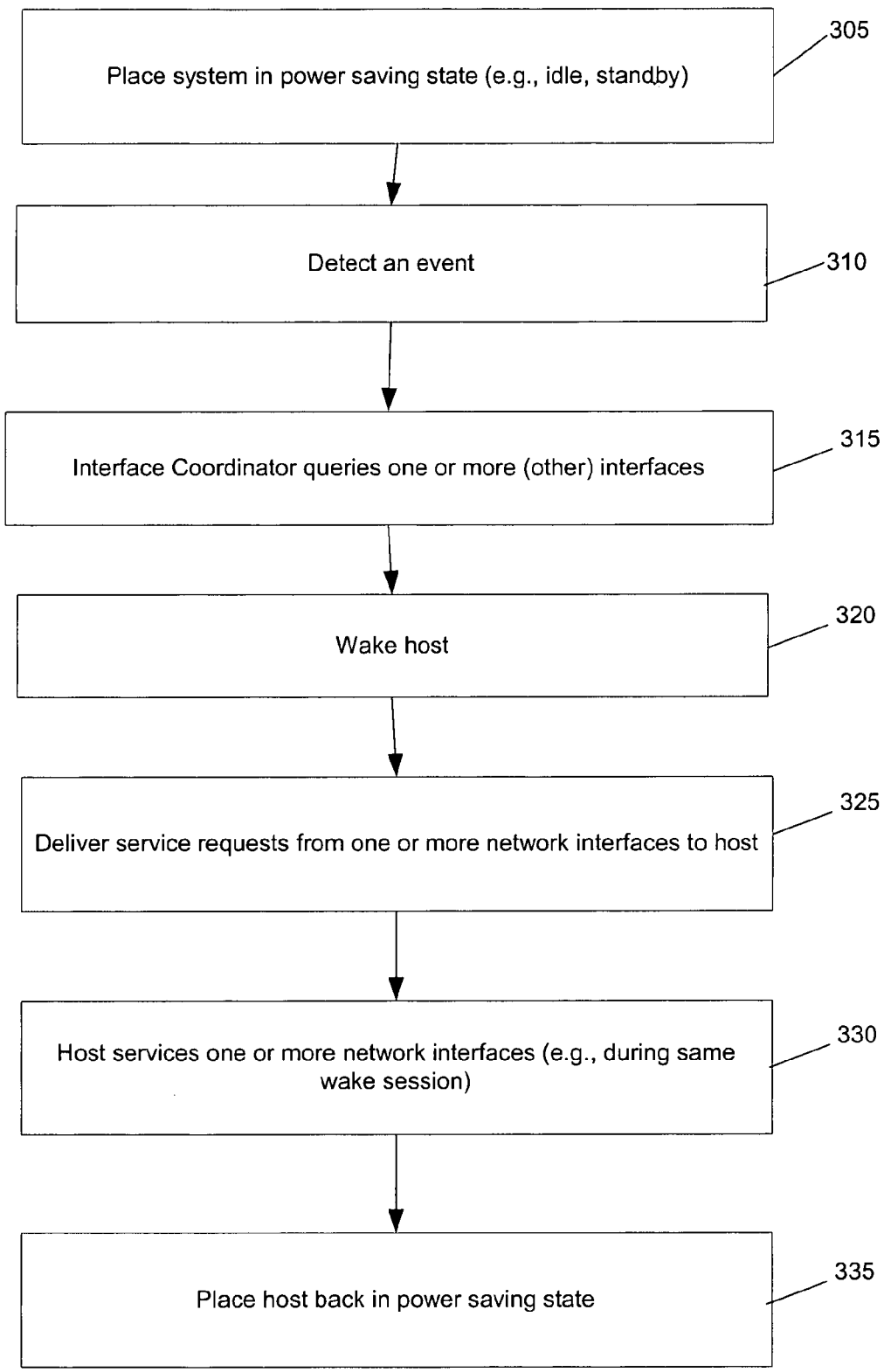
FIG. 3 is a flow chart illustrating operation of a system according to an example embodiment.

FIG. 3 is a flow chart illustrating operation of a computing system according to an example embodiment. In this example embodiment, the network interface coordinator may be provided within the host hardware (e.g., within chipset or processor), shown as interface coordinator 210B or may be provided as interface coordinator 210C which may be coupled to the network interfaces. The placement of an interface coordinator within the host hardware 215 and/or within (or coupled to) the network interfaces may be referred to herein as an embedded network interface coordinator, although the invention is not limited thereto.

Referring to FIG. 3, at 305, some portion of the system 200 may be placed in a power saving state, such as by placing the processor 216, memory 217, chipset 218 and possibly one or more network interfaces 220, for example, in a power saving state.

At 310, one of the network interfaces 220 may detect an event. This event may be synchronous or asynchronous, internal (to the hardware or network interfaces 320) or external, etc. At 315, the embedded network interface coordinator 210 may query one or more (or even all) of the other network interfaces, such as to determine if any of the other network interfaces 220 may require servicing. Block 315 may be optional in some embodiments. At 320, the network interface coordinator 210 may wake the host processor from its power saving state.

At 325, the network interface coordinator may deliver or identify to host processor 216 one or more service requests associated with the network interfaces. These service requests may include a service request associated with the initially detected event (block 310) as well as any additional service requests that may have been identified via block 315.

At 330, host processor 216 may service the one or more network interfaces (or service the service requests from the one or more network interfaces). According to an example embodiment, the host processor 216 may service the one or more network interfaces during the same wake session (e.g., service a plurality network interfaces before returning to power saving state). At 325, after servicing the one or more network interfaces, the system or host processor and other components may return to the power saving state.

Figure 4:
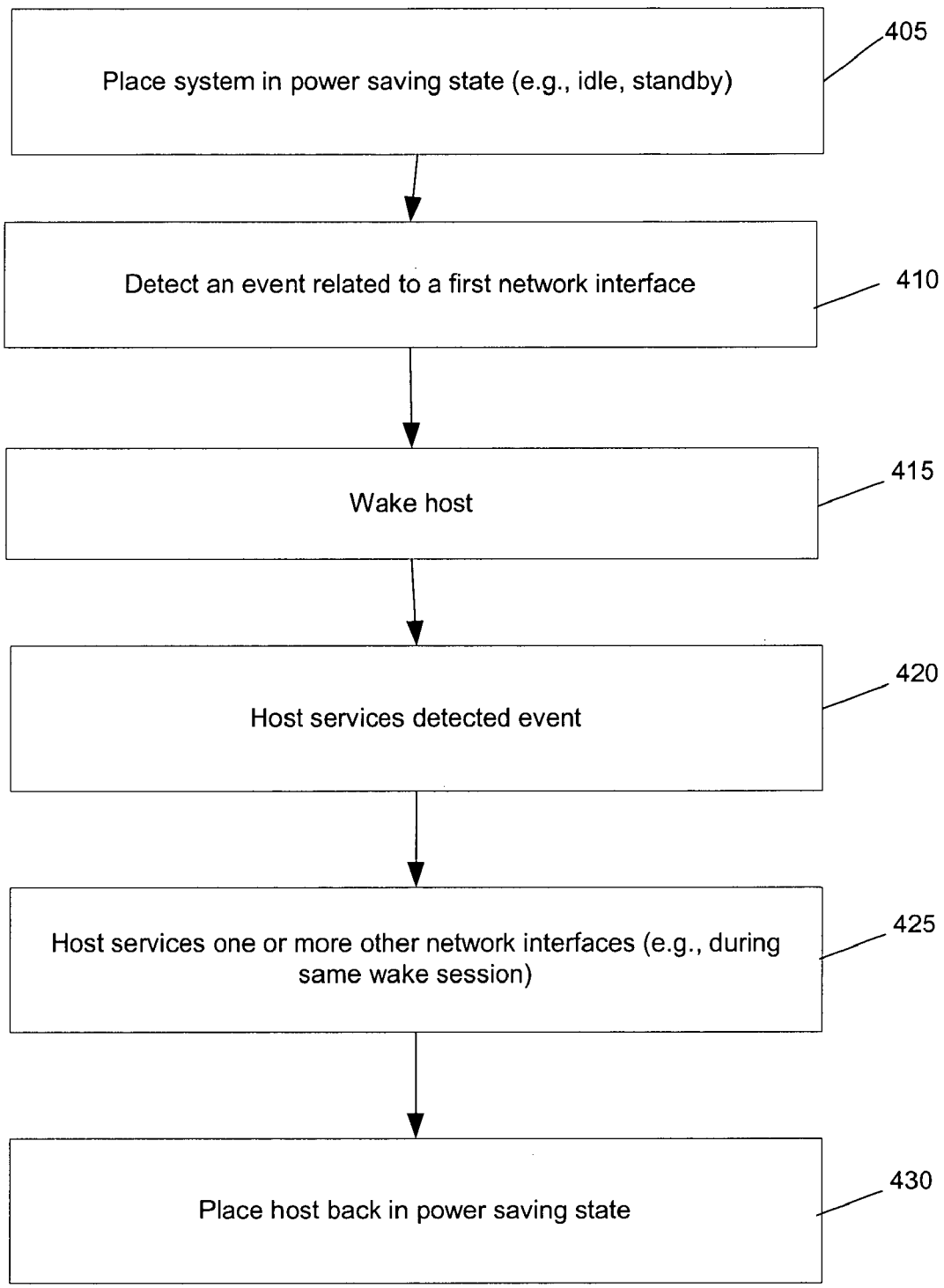
FIG. 4 is a flow chart illustrating operation of a system according to another embodiment.

FIG. 4 is a flow chart illustrating operation of a computing system according to another embodiment. In the example embodiment shown in FIG. 4, the network interface coordinator 210 may be provided, for example, as software (210A) within the operating system 205 or provided within host hardware, although the embodiment, is not limited thereto.

At 405, system 200 (e.g., processor 216) may be placed in a power saving state. At 410, an event may be detected and the event may wake the host processor (e.g., placing the host processor in a normal operating state) at 415. In an example embodiment, a network interface 220 may detect an event at 410 and then the network interface may wake the host processor from its power saving state at 415, although the invention is not limited thereto.

At 420, the host processor may service the detected event (or may service the network interface that detected the event). This may include servicing the network interface that received an external event, or may include servicing a network interface in response to an internal or OS timer event associated with that network interface.

At 425, the host processor may service one or more other network interfaces during a same wake session. This allows a host processor to more efficiently use its wake time to service multiple network interfaces, event though only one of the network interfaces may have requested service or detected an event.

At 430, the computing system (e.g., host processor and possibly one or more other devices) may be placed back in a power saving state.

By servicing not only the network interface that received an event but also one or more other network interfaces during the same wake session, this technique may eliminate or at least reduce the need for one or more instances of power cycling of the host system. Power cycling may refer to the transition of the processor between a normal operating state and a power saving state, for example. In this manner, when one of the network interfaces triggers host activity (e.g., detects an event and wakes the host processor) or is queried by the host, both or all (or at least a plurality) of the network interfaces may be serviced together or during the same wake session. This is a more efficient use of the host processor's wake time, by handling service requests from a plurality of network interfaces (or by servicing a plurality of network interfaces) during one wake session. A wake session may refer to, for example, a period of time where a processor is operating normally (or is awake), before returning to a power saving state. By using these type of interface coordination techniques, host processor idle (power saving) time and battery life may be improved, according to an example embodiment, although the invention is not limited thereto.

Figure 5:
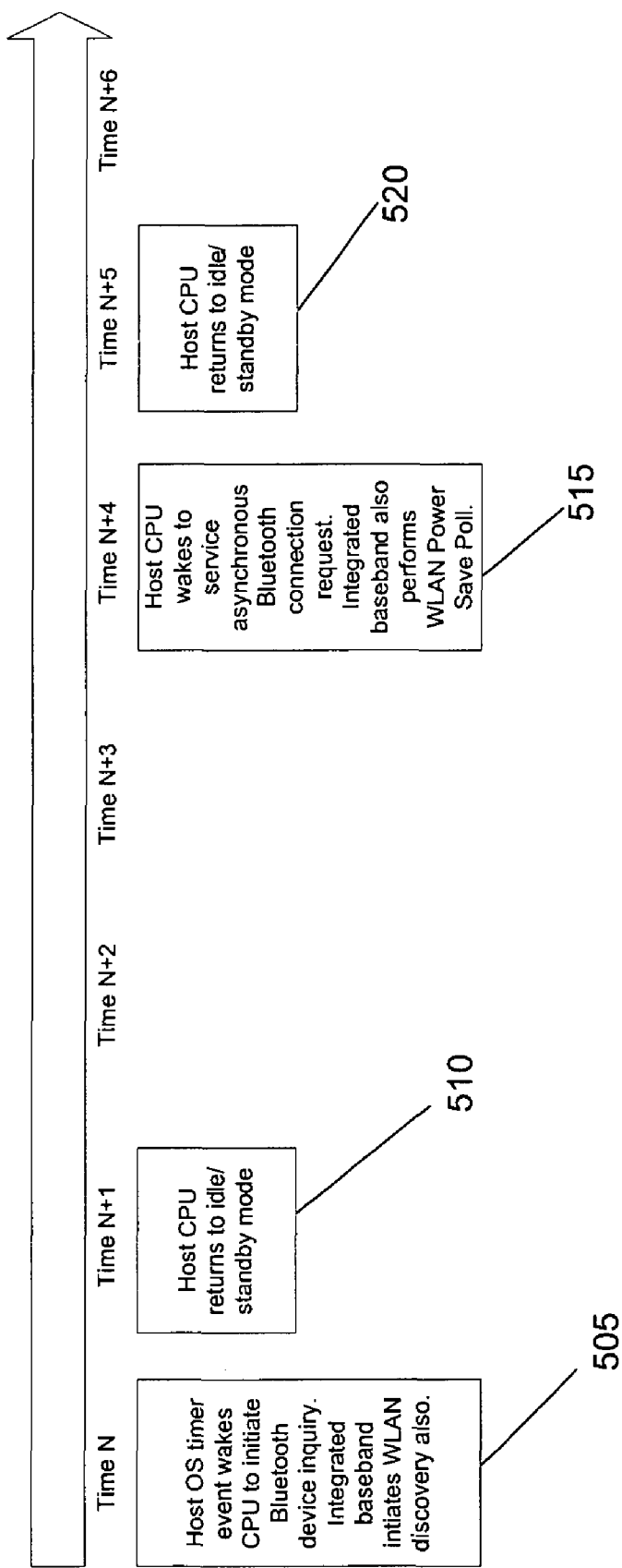
FIG. 5 is a diagram illustrating an example operation of a system according to yet another embodiment.

FIG. 5 is a diagram illustrating an example operation of a computing system according to yet another embodiment. At 505, at time N, a host operating system timer event may wake the host processor to initiate a Bluetooth device inquiry. This may be done by the host processor sending a request to the Bluetooth interface 220Z to perform the Bluetooth device inquiry, although the invention is not limited thereto. While the host processor 216 (and other components of system 200) are awake, the host processor 216 and/or interface coordinator 210 may then prompt the WLAN interface (e.g., prompt the WLAN baseband section of WLAN network interface) to perform a WLAN discovery. Thus, after receiving an internal and synchronous event (an OS timer event) and being placed in normal operating state, the host processor may advantageously service both network interfaces during this same wake session (e.g., services the network interface associated with the timer event, and then services the other network interface), although the invention is not limited thereto.

At 510, at time N+1, the system (e.g., host processor) returns to a power saving state.

At 515, at time N+4, the host processor wakes to service an asynchronous Bluetooth service request. During this wake session, the host processor also prompts or sends a message to the WLAN network interface for the WLAN network interface to perform a WLAN function, such as a WLAN power save poll for instance. Thus, in response to an external and asynchronous event (in this case a request for a connection received at the Bluetooth interface), the host processor may service both the Bluetooth interface 220Z (the interface associated with the received event) as well as the WLAN interface 220B. At 520, at time T+5, the host processor may return to a power saving state. The description provided in FIG. 5 is illustrative only, and the invention is not limited thereto.

Figure 6:
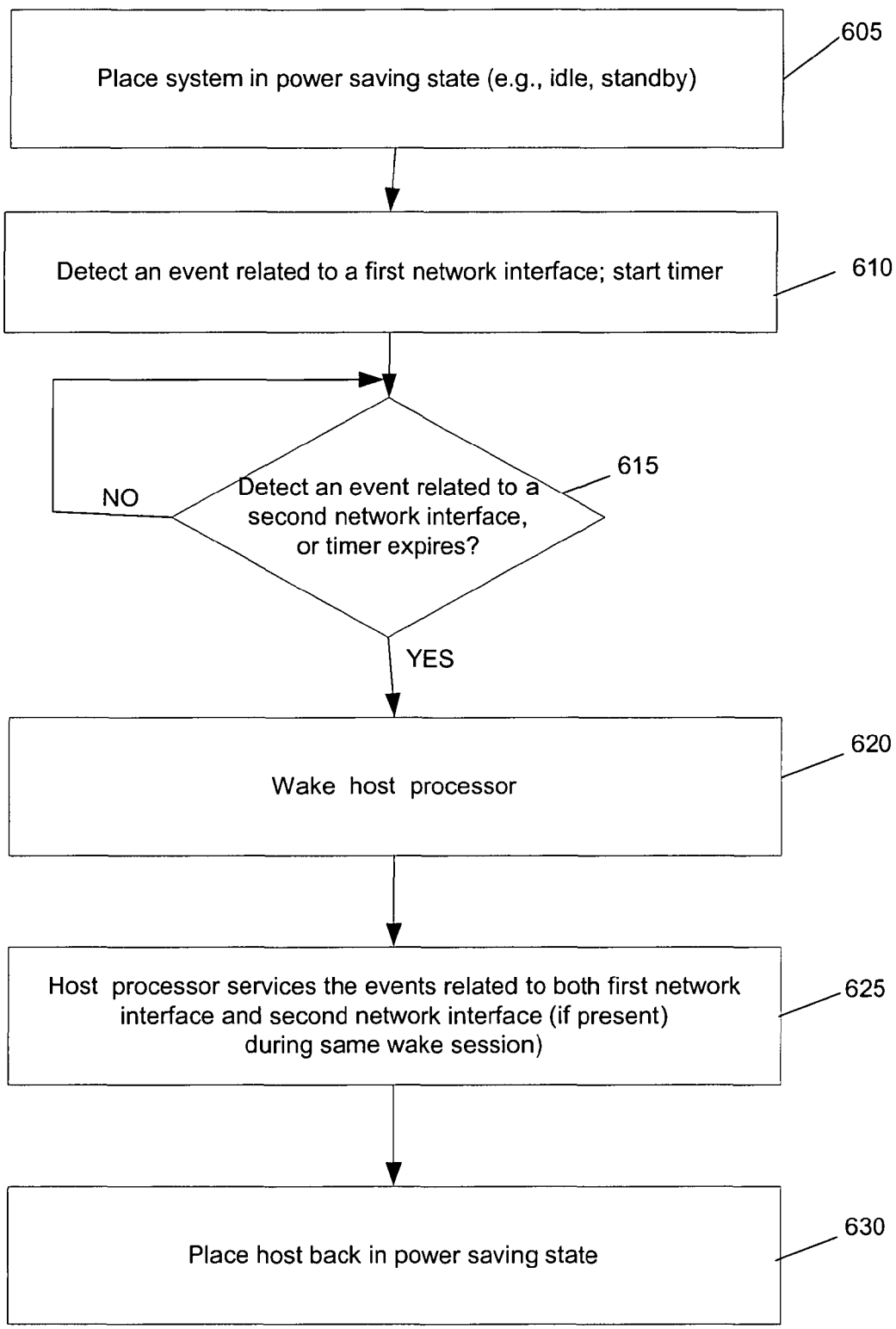
FIG. 6 is a flow chart illustrating operation of a system according to yet another embodiment.

FIG. 6 is a flow chart illustrating operation of a computing system according to yet another embodiment. At 605, the system is placed in a power saving mode. At 610, the system detects an event related to a first network interface, and starts a timer. This may involve a network interface receiving an event and notifying the interface coordinator of the event.

At 615, the system determines whether an event has been received that relates to a second network interface, or if the timer has expired. If not, the system may wait until such an event is detected or the timer expires.

At 620, the interface coordinator may wake the host processor, if it is not already awake. This block is optional, since it may already be awake.

At 625, the host processor may service the events related to both the first and second network interfaces, e.g., during the same wake session. If the timer expired without receipt of the event related to the second network interface, the system may service the event related to just the first network interface. However, the preference is to service multiple events in a single wake session. At 630, the host processor may return to a power saving mode.

This technique of coordinating or aggregating the servicing of multiple network interfaces may provide a more efficient use of the processor's wake time, and may decrease the amount of power cycling and may decrease the amount of power consumed by the system.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method of coordinating the servicing of events in a system having multiple network interfaces, the method comprising:
   detecting an event associated with a first network interface;
   querying a second network interface to determine if the second network interface requires servicing;
   waking a host processor in response to the detected event;
   servicing the first network interface based on the detected event; and
   servicing the second network interface during a same wake session.

2. The method of claim 1 wherein the detecting comprises detecting an event selected from the group comprising:
   a synchronous event;
   an asynchronous event;
   an internal event; and
   an external event.

3. The method of claim 1 wherein the detecting an event comprises the first network interface receiving a request from an external device.

4. The method of claim 1 wherein the detecting an event comprises detecting an event at the first network interface.

5. A method comprising:
   detecting an event related to a first network interface;
   querying a second network interface to determine if the second network interface requires servicing;
   waking a host processor in response to the detected event;
   servicing the first network interface and the second network interface in response to the detecting;
   wherein the servicing comprises servicing the first network interface and the second network interface during a same wake session in response to the detecting.

6. The method of claim 5 wherein the detecting comprises detecting an event related to the first network interface selected from the group comprising:
   a synchronous event;
   an asynchronous event;
   an internal event; and
   an external event.

7. The method of claim 5 wherein the detecting comprises detecting an event received at the first network interface.

8. The method of claim 5 wherein the servicing comprises servicing the host processor detecting a timer event related to servicing the first network interface.

9. The method of claim 5 and further comprising:
   placing the host processor in a power saving state prior to detecting the event; and
   returning the host processor to the power saving state after servicing the first and second network interfaces.

10. A method in a system having multiple network interfaces, the method comprising:
    detecting an event related to a first network interface;
    detecting an event related to a second network interface;
    querying any one of the first and second network interfaces to determine if any one of the first and second network interfaces require servicing;
    waking a processor in response to the detecting of an event;
    notifying the processor of the events for the first and second network interfaces;
    servicing the events for both the first and second network interfaces in response to the notifying;
    wherein the servicing comprises servicing the first network interface and the second network interface during a same wake session in response to the detecting of an event related to a first network interface or a second network interface.

11. The method of claim 10 wherein the notifying comprises sending an interrupt to the processor.

12. The method of claim 10 wherein notifying comprises waking the processor from a power saving state and notifying the processor of the detected events.

13. The method of claim 10 wherein the system is placed in a power saving state prior to the detecting, and the system is returned to the power saving state after the servicing.

14. An apparatus comprising:
    a host processor;
    at least two network interfaces coupled to the host processor; and
    an interface coordinator adapted to coordinate servicing of the at least two network interfaces upon detection of an event related to a first network interface, the interface coordinator to query a second network interface to determine if the second network interface requires servicing;
    wherein the host processor is awakened in response to the detected event; and
    wherein servicing comprises servicing the first network interface and the second network interface during a same wake session in response to the detecting.

15. The apparatus of claim 14 wherein:
    the first network interface is in communication with a first wireless network; and
    the second network interface is in communication with a second wireless network.

16. The apparatus of claim 15 wherein the first network interface comprises a WLAN network interface and the second network interface comprises a WPAN network interface.

17. The apparatus of claim 16 wherein the WPAN network interface comprises a Bluetooth network interface.

18. The apparatus of claim 14 wherein the first network interface is in communication with a wired network, and the second network interface is in communication with a wireless network.

19. The apparatus of claim 18 wherein the first network interface comprises an Ethernet network interface and the second network interface comprises a WLAN network interface.

* * * * *